US012761672B2

(12) United States Patent
Graf et al.

(10) Patent No.: US 12,761,672 B2
(45) Date of Patent: Oct. 13, 2026

(54) IMAGE-BASED METHOD FOR SIMPLIFYING A VEHICLE-EXTERNAL TAKEOVER OF CONTROL OF A MOTOR VEHICLE, ASSISTANCE DEVICE, AND MOTOR VEHICLE

(71) Applicant: Bayerische Motoren Werke Aktiengesellschaft, Munich (DE)

(72) Inventors: Gerhard Graf, Munich (DE); Christopher Kuhn, Munich (DE); Zhenxin Zhang, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 193 days.

(21) Appl. No.: 18/273,589

(22) PCT Filed: Jan. 10, 2022

(86) PCT No.: PCT/EP2022/050353
§ 371 (c)(1),
(2) Date: Jul. 21, 2023

(87) PCT Pub. No.: WO2022/157025
PCT Pub. Date: Jul. 28, 2022

(65) Prior Publication Data
US 2024/0103548 A1 Mar. 28, 2024

(30) Foreign Application Priority Data
Jan. 22, 2021 (DE) ..................... 10 2021 101 363.1

(51) Int. Cl.
*G05D 1/80* (2024.01)
*G05D 1/224* (2024.01)
(Continued)

(52) U.S. Cl.
CPC ............. *G05D 1/80* (2024.01); *G05D 1/2247* (2024.01); *G06T 7/10* (2017.01); *G06V 10/26* (2022.01);
(Continued)

(58) Field of Classification Search
CPC ...... G05D 1/80; G05D 1/2247; G05D 1/0038; G06T 7/10; G06T 2207/20112; G06V 10/26; G06V 20/70
See application file for complete search history.

(56) References Cited

U.S. PATENT DOCUMENTS 6,578,017 B1 * 6/2003 Ebersole ............... G06T 7/0012 706/9
2017/0308092 A1 10/2017 Altinger et al.
(Continued)

FOREIGN PATENT DOCUMENTS

CN 108985194 A 12/2018
CN 109690558 A 4/2019
(Continued)

OTHER PUBLICATIONS

Kuhn, Christopher B., et al. "Introspective failure prediction for semantic image segmentation." 2020 IEEE 23rd International Conference on Intelligent Transportation Systems (ITSC). IEEE, 2020. (Year: 2020).*
(Continued)

*Primary Examiner* — Scott A Browne
*Assistant Examiner* — Jisun Choi
(74) *Attorney, Agent, or Firm* — Crowell & Moring LLP

(57) ABSTRACT

A method is provided for simplifying a takeover of control of a motor vehicle by a vehicle-external operator. In the method, images of the surroundings of the vehicle are captured from the vehicle and semantically segmented. Errors in a corresponding segmentation model are predicted
(Continued)

on the basis of at least one such image each. If a corresponding error prediction triggering a request for the takeover of control is made, an image-based visualization is automatically generated in which exactly one region corresponding to the error prediction is visually highlighted. The request and the visualization are then sent to the vehicle-external operator.

11 Claims, 1 Drawing Sheet

(51) Int. Cl.

| | |
|---|---|
| ***G05D 109/10*** | (2024.01) |
| ***G06T 7/10*** | (2017.01) |
| ***G06V 10/26*** | (2022.01) |
| ***G06V 20/56*** | (2022.01) |
| ***H04W 4/40*** | (2018.01) |
| *G05D 111/30* | (2024.01) |

(52) U.S. Cl.

CPC .............. *G06V 20/56* (2022.01); *H04W 4/40* (2018.02); *G05D 2109/10* (2024.01); *G05D 2111/30* (2024.01); *G06T 2207/20081* (2013.01); *G06T 2207/20084* (2013.01); *G06T 2207/20112* (2013.01); *G06T 2207/30252* (2013.01)

(56) References Cited

U.S. PATENT DOCUMENTS

| | | | | |
|---|---|---|---|---|
| 2017/0323179 | A1 | | 11/2017 | Vallespi-Gonzalez |
| 2018/0136651 | A1 | * | 5/2018 | Levinson ............. G05D 1/0027 |
| 2019/0391578 | A1 | * | 12/2019 | Tariq .......................... G06T 3/40 |
| 2020/0004240 | A1 | | 1/2020 | Biehler et al. |
| 2020/0039535 | A1 | | 2/2020 | Marberger et al. |
| 2021/0181757 | A1 | * | 6/2021 | Goel ........................ G06T 7/579 |
| 2023/0386167 | A1 | * | 11/2023 | Fuelster ............... G06V 10/776 |

FOREIGN PATENT DOCUMENTS

| | | | | | |
|---|---|---|---|---|---|
| CN | 109863461 | A | | 6/2019 | |
| CN | 110930417 | A | * | 3/2020 | ............. G06N 3/045 |
| CN | 111666921 | A | | 9/2020 | |
| DE | 10 2006 012 773 | A1 | | 11/2006 | |
| DE | 10 2014 015 075 | A1 | | 4/2016 | |
| DE | 10 2017 213 204 | A1 | | 2/2019 | |
| DE | 10 2018 116 515 | A1 | | 1/2020 | |
| DE | 10 2019 201 990 | A1 | | 8/2020 | |
| DE | 10 2019 105 489 | A1 | | 9/2020 | |
| JP | 2018-538647 | A | | 12/2018 | |
| WO | WO 2018/232032 | A1 | | 12/2018 | |

OTHER PUBLICATIONS

Haldimann, David, et al. "This is not what I imagined: Error Detection for Semantic Segmentation through Visual Dissimilarity." arXiv preprint arXiv:1909.00676 (2019). (Year: 2019).*

Xia, Yingda, et al. "Synthesize then compare: Detecting failures and anomalies for semantic segmentation." Computer Vision-ECCV 2020: 16th European Conference, Glasgow, UK, Aug. 23-28, 2020, Proceedings, Part I 16. Springer International Publishing, 2020. (Year: 2020).*

CN110930417A_machine_translation (Year: 2020).*

International Search Report (PCT/ISA/210) issued in PCT Application No. PCT/EP2022/050353 dated Apr. 20, 2022 with English translation (6 pages).

German-language Written Opinion (PCT/ISA/237) issued in PCT Application No. PCT/EP2022/050353 dated Apr. 20, 2022 (9 pages).

German-language Search Report issued in German Application No. 10 2021 101 363.1 dated Oct. 19, 2021 with partial English translation (11 pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

Kuhn, C. et al., "Introspective Failure Prediction for Autonomous Driving Using Late Fusion of State and Camera Information", IEEE Transactions on Intelligent Transportation Systems, [Online] Bd. 1, Dec. 29, 2020, p. 1-15, XP055897640, Piscataway, NJ, USA, ISSN: 1524-9050, Internet: URL: https://ieeexplore.ieee.org/stampPDF/getPDF.jsp?tp=&arnumber=9310689&ref=aHR0cHM6Ly9pZWVIeHBsb3JILmIIZWUub3JnL2RvY3VtZW50LzkzMTA2ODk= [retrieved on Mar. 4, 2022] dated Dec. 10, 2020 (15 pages).

Xia, Y.et al, "Synthesize Then Compare: Detecting Failures and Anomalies for Semantic Segmentation", Sep. 8, 2020, Computer Vision—ECCV 2020: 16th European Conference, Glasgow, UK, Aug. 23-28, 2020 : Proceedings; [Lecture Notes In Computer Science ; ISSN 0302-9743], pp. 145-161, Sep. 8, 2020; XP047593604, ISBN: 978-3-030-58594-5 (17 pages).

Kuhn, C. et al., "Introspective Failure Prediction for Semantic Image Segmentation", 2020 IEEE 23rd International Conference on Intelligent Transportation Systems (ITSC), [Online] Sep. 20, 2020, pp. 1-6, XP055897523, DOI: 10.1109/ ITSC45102.2020.9294308, ISBN: 978-1-7281-4149-7, retrieved from Internet: URL:https://ieeexplore.ieee.org/stampPDF/getPDF.jsp?tp=&arnumber=9294308&ref=aHR0cHM6Ly9pZWVIeHBsb3JILmllZWUub3JnL2Fic3RyYWN0L2RvY3VtZW50LzkyOTQzMDg=[gefunden am Mar. 3, 2022] dated Sep. 20, 2020 (6 pages).

Chinese-language Office Action issued in Chinese Application No. 2022800093333 dated Mar. 6, 2026, with English translation (13 pages).

* cited by examiner

IMAGE-BASED METHOD FOR SIMPLIFYING A VEHICLE-EXTERNAL TAKEOVER OF CONTROL OF A MOTOR VEHICLE, ASSISTANCE DEVICE, AND MOTOR VEHICLE

BACKGROUND AND SUMMARY OF THE INVENTION

The present invention relates to an image-based method for simplifying a takeover of control of a motor vehicle by a vehicle-external operator. The invention furthermore relates to an assistance unit configured for this method and a motor vehicle equipped therewith.

Although the development of autonomous or automated motor vehicles is continuously progressing further, errors in presently available systems are still unavoidable. An approach for dealing with these problems is that in case of an error, thus when the respective motor vehicle cannot manage a specific situation completely autonomously or automatically, a vehicle-external operator, also referred to as a teleoperator, takes over the control of the respective motor vehicle, thus its control in remote control. However, there are also different challenges in this case. For example, recognizing and understanding a respective situation and environment of the motor vehicle is a difficult task for a vehicle-external operator, which can require a significant period of time before the operator can safely control the respective motor vehicle through the respective situation.

Such a method for an intervention during an operation of a vehicle which has autonomous driving capabilities is described in WO 2018/232 032 A1. In the method therein, it is determined that a corresponding intervention is appropriate. Based thereon, a person is made capable of providing items of information for the intervention. Finally, the intervention is initiated. For this purpose, for example, a teleoperation system can interact with the respective vehicle to handle various types of events, for example those events which can result in risks such as collisions or traffic jams.

As a further approach, a remote control system and a method for correcting a trajectory of an autonomous unmanned vehicle is described in JP 2018 538 647 A. Data which identify an event associated with the vehicle are detected and the event is identified therein on the basis of a received control message of the vehicle. Furthermore, one or more measures to be implemented in response to these data are identified, for which corresponding ranks are then calculated. The measures are then simulated to generate a strategy. Items of information associated with at least one subset of the measures are provided for display on a display device of a remote operator. A measure selected from the displayed subset of measures is then transmitted to the vehicle.

The object of the present invention is to enable particularly simple and rapid takeover of control of a motor vehicle by a vehicle-external operator.

This object is achieved according to the claimed invention.

The method according to embodiments of the invention is used to simplify a takeover of control of a motor vehicle by a vehicle-external operator. In other words, taking over the control or remote control of the motor vehicle is to be facilitated for the vehicle-external operator, thus a teleoperator. Since at the point in time of this takeover of control the vehicle-external operator is not familiar with the respective situation of the motor vehicle, thus its environment and driving status, and cannot receive corresponding data directly, but rather only via a display device, for example, the takeover of the control of the motor vehicle can represent a significant challenge and can claim a significant amount of time. To simplify this, in one method step of the method according to embodiments of the invention, in a conditionally automated operation of the motor vehicle, images or in each case at least one image or corresponding image data of a respective environment of the motor vehicle are acquired. This at least one image is then semantically segmented by way of a predetermined trained segmentation model. The segmentation model can be or comprise, for example, an artificial neural network, which is in particular deep, thus multilayered, for example a deep convolutional neural network (deep CNN). The segmentation model can be, for example, part of a corresponding data processing unit of the respective motor vehicle. In other words, the semantic segmentation of the at least one image of the respective environment can be carried out in particular in the motor vehicle itself, thus by a unit of the motor vehicle itself. This enables the semantic segmentation to be carried out particularly promptly, thus with low latency.

A conditionally automated operation of the motor vehicle in the present meaning can correspond, for example, to autonomy level SAE J3016 level 3 or level 4. In the conditionally automated operation, the motor vehicle can thus temporarily move autonomously, however, in a situation which is not to be reliably managed autonomously, however, can surrender the control of the motor vehicle, thus its control to a human operator. The latter is also designated as disengagement.

In a further method step of the method according to embodiments of the invention, errors of the segmentation model in the semantic segmenting of at least one of the images are predicted based on at least one of the recorded images in each case, in particular pixel by pixel, thus with pixel accuracy. For this purpose, for example, a predetermined correspondingly trained error prediction model can be used. Ultimately, however, an at least nearly arbitrary error prediction method can be applied, which is based on a visual input, thus processes images or image data as input data. A correspondingly trained, in particular multilayered artificial neural network can thus also be used for this error prediction. The error prediction can also be carried out, as described in conjunction with the semantic segmentation, in the respective motor vehicle, thus by a unit of the motor vehicle.

In a further method step of the method according to embodiments of the invention, in case of a corresponding error prediction, which triggers an automatic output of a request for the takeover of control by the vehicle-external operator according to a predetermined criterion, an image-based visualization is automatically generated, in which precisely the area corresponding to the respective error prediction is visually highlighted. In other words, the visualization is thus generated when at least one predetermined condition is met, for example, with respect to a type and/or a severity of the respective predicted error or if at least one predetermined number of errors has been predicted or if the error prediction reaches or exceeds a certain predetermined scope.

The area highlighted, thus identified, in the visualization can in this case comprise a coherent area or multiple, possibly disjointed, partial areas. The highlighted area corresponding to the respective error prediction is in this case that area which has resulted in the error prediction or the predicted error or the predicted errors or a corresponding image or data area of a representation derived from the respective image, in which the error or the errors have occurred or are located.

If the error prediction is accurate by pixel, the area corresponding thereto, also referred to as the error area, can accordingly also be visually emphasized with pixel accuracy. To highlight the error area, it can, for example, be colored or represented in a signal color or at least one predetermined contrast with respect to a color or shading the other image areas have, can be provided with a border, in particular colored, and/or the like. Moreover, the other area of the respective image or the respective visualization can, for example, be darkened, desaturated in color, reduced in its intensity, and/or adjusted in another manner to relatively highlight the error area.

Due to this visual highlighting of the error area, it is recognizable particularly easily and quickly, wherein no other image or representation areas are concealed at the same time. The latter can be the case, for example, in conventional notices by an overlaid notice or warning symbol or the like. In contrast, embodiments of the present invention enable the error area to be highlighted and all details also to be left or kept recognizable at the same time. The visualization can be, for example, a visual representation, which can correspond in its dimensions to the recorded images.

In a further method step of the method according to embodiments of the invention, the request and the visualization are sent to the vehicle-external operator. The visualization can thus, for example, be sent or transmitted jointly with the request to take over control of the motor vehicle to the or a vehicle-external operator or a corresponding exchange or receiving unit.

Since the errors of the segmentation model are predicted based on or on the basis of spatial features of the images or spatial features depicted in the images, in the present case the spatial nature of the error prediction is used to visualize to the vehicle-external operator from or in which spatial area or image area the errors originate or result. The vehicle-external operator, also referred to in short as an operator hereinafter, can thus directly recognize and identify function-critical or safety-critical areas or features particularly easily and quickly, without first having to acquire the entire image and search it for possible problem causes, which have resulted in the request for the takeover of control. The operator can thus focus directly on the particularly demanding parts of the environment or the driver task, which are thus problematic for the respective motor vehicle or its conditionally automated test or partially autonomous control system, and accordingly can initiate corrective measures particularly quickly, for example, to avoid an accident or a stoppage of the motor vehicle.

In the present case, it is thus proposed that a result or an output of the error prediction itself be used to visually emphasize critical areas of the environment for the operator. The operator is thus not only notified by the request to take over control that the motor vehicle is in general overburdened with the respective situation, but rather what or where precisely the respective problem cause is from the perspective of the motor vehicle.

In embodiments of the present invention, in particular only those areas can be visually emphasized here which have actually resulted in an error or will result in an error according to the error prediction, instead of generally visually emphasizing all areas of a certain class, for example, based on the semantic classification. The presently provided visualization or the highlighted image areas are thus directly linked to the cause thereof that the motor vehicle has emitted the respective request for the takeover of control and to the corresponding spatial area or feature. This enables the operator to take over the secure control of the motor vehicle in the respective situation faster and more easily than is typically the case using conventional methods. This can result in or contribute to improved safety in road traffic.

Since the type of the predicted errors is not restricted in embodiments of the present invention, moreover any type of area can be identified as an error area and visually highlighted accordingly. The highlighting is thus not restricted here, for example, to specific individual objects or object types, such as other road users or the like. This can be achieved, for example, by corresponding training, in particular introspective with respect to the segmentation model, of a model used in the context of the error prediction. The takeover of control can be simplified in a large number of different situations in this way.

Embodiments of the present invention not only determine whether the respective current image of the motor vehicle or its assistance or control system responsible for the conditionally automated or partially autonomous operation was correctly understood, rather it is proposed that image-based error detection be used predictively. This can represent a safety-relevant supplementation or adaptation of existing methods, in which typically the environment of the motor vehicle is transmitted neutrally, for example in the form of a direct video stream, to the teleoperator.

In one possible embodiment of the present invention, the errors of the segmentation model are predicted pixel by pixel. A number of the predicted errors and/or an average error is then determined based thereon for the respective image. It is then checked as the predetermined criterion for the output of the request to take over control whether the number of the errors and/or the average error is greater than a predetermined error threshold. The average error can be determined, for example, as the average error probability, confidence, or degree of severity over all pixels of the respective image or the respective semantic segmentation. The takeover of the control by the teleoperator can be initiated particularly early in potentially critical situations due to a relatively low error threshold value, which can result in further improved safety. A relatively large error threshold value, in contrast, can have the result that the control of the motor vehicle is more reliably only surrendered to the teleoperator in actually critical situations. In any case, negligible errors which most likely will not result in an actually safety-critical situation or an accident of the motor vehicle can be filtered out by a nonzero error threshold value. Bandwidth and effort can thus be saved and stress of the teleoperator can be reduced. It is thus made possible in a practical manner to operate a large number of corresponding motor vehicles without an at least approximately equally large number of teleoperators having to be ready for use. Thus, for example, a misclassification of a single pixel, a misclassification of a part of a building adjacent to a respective traveled road, or the like can ultimately be irrelevant in practice for safe autonomous operation of the motor vehicle.

In a further possible embodiment of the present invention, the errors of the segmentation model are predicted pixel by pixel, wherein a size of a coherent area of error pixels, thus predicted pixels classified as erroneous, is determined. It is then checked as the predetermined criterion for the output of the request to take over control whether the size of the coherent area at least corresponds to a predetermined size threshold value. If there are multiple coherent areas of error pixels, this can be carried out for each individual one of the areas or at least until an area of error pixels has been found, the size of which at least corresponds to the predetermined size threshold value. In other words, it can thus be provided that the request to take over control by the vehicle-external operator is only triggered, thus output or sent, if there is at least one coherent area of error pixels which is sufficiently large to meet the corresponding predetermined criterion, thus, for example, is larger than the size threshold value. The size threshold value can be specified here as an absolute area or an area measured in pixels or as a percentage proportion of the total size or total number of pixels of the respective image or the respective semantic segmentation. The number of the predicted errors and/or their probability or severity is thus not taken into consideration here or is not solely taken into consideration here, but rather also their spatial distribution. It can thus be taken into consideration that a relatively small area of error pixels having a size below the predetermined size threshold value would in any case not be recognizable by the teleoperator and/or is probably not safety-critical or safety-relevant in any case. In contrast, a correct autonomous behavior of the motor vehicle can be all the more improbable the larger a predicted coherent area of error pixels is. Due to the embodiment proposed here, the method according to the invention can be applied practically, thus with manageable effort with respect to the operational readiness of a sufficient number of vehicle-external operators. To further improve the safety or reduce effects of critical situations, the so-called disengagement of the correspondingly operated motor vehicles, it can moreover be provided, upon fully-utilized capacity of the vehicle-external operator or operators, to prioritize a request to take over control which is based on an area of error pixels from a predetermined size over other requests which are based on areas of error pixels of smaller size. The corresponding request can be provided, for example, with a priority flag for this purpose.

In a further possible embodiment of the present invention, by way of a predetermined reconstruction model, from the respective semantic segmentation, the acquired image respectively underlying it is approximated or reconstructed by generating a corresponding reconstruction image. The respective visualization is then generated based on the respective reconstruction image. The reconstruction model can be or comprise here, for example, a correspondingly trained artificial neural network. This can fill the reconstruction image with corresponding objects according to the classification of individual areas given by the semantic segmentation, thus construct it from corresponding objects. Errors of the segmentation model in the semantic segmentation of the respective underlying image then result in corresponding discrepancies or differences between the respective underlying image and the generated reconstruction image based on its semantic segmentation. These discrepancies can then be visually highlighted in the visualization. This enables a particularly effective automatic highlighting of the error areas in a representation otherwise at least nearly corresponding to reality. Particularly effective and secure control of the motor vehicle by the teleoperator is enabled in this way. Moreover, the error prediction or the emphasized error areas are based here on the actual interpretation of the respective situation by the segmentation model, so that, for example, no possibly inaccurate assumptions have to be made about its capabilities or situation understanding. This can enable a particularly robust, reliable, and accurate visualization of the error areas and thus contribute to the safety in road traffic.

In one possible refinement of the present invention, the reconstruction model comprises generative adversarial networks, also referred to as GANs, or is formed thereby. The use of such GANs for generating the reconstruction image enables an at least nearly photorealistic approximation of the respective originally acquired image. Generating a particularly easily comprehensible visualization, which is as similar as possible to the real environment, can thus be enabled, for example. This can in turn enable the teleoperator to have particularly easy and rapid understanding of the respective situation and correspondingly particularly easy and rapid takeover of the control of the respective motor vehicle. Moreover, the reconstruction image thus generated can thus be compared, for example, particularly easily, well, and robustly with the respective underlying acquired image, in order to detect corresponding discrepancies, thus errors of the segmentation model, particularly robustly and reliably.

In a further possible embodiment of the present invention, the reconstruction image is compared in each case to the respective underlying acquired image to predict the errors. The errors are then predicted on the basis of differences detected here, thus are detected or are given by these differences. Pixel, intensity, and/or color values can be compared here. A difference threshold value can be predetermined in this case, so that the detector differences are only determined as errors if the detected differences at least correspond to the predetermined difference threshold value. Another criterion can also be predetermined and checked, for example, with respect to the number of pixels or discrepancies or corresponding discrepancy areas, their size, and/or the like.

The respective reconstruction image can be subtracted, for example, based on image value or pixel value from the respective underlying image or vice versa. An average difference of the image or pixel values can then be determined, for example, and compared to the predetermined difference threshold value. However, individual sufficiently large differences can also result in an error prediction or triggering of the output of the request to take over the control of the motor vehicle. A second difference threshold value can optionally be predetermined for this purpose. It can thus be ensured that significant deviations, thus correspondingly significant misclassifications, results in each case in a surrender of the control of the motor vehicle to the operator, even if these misclassifications only make up or affect a relatively small proportion of the respective image.

By predicting or detecting the errors on the basis of the comparison of the reconstruction image to the respective underlying image, the error prediction can be carried out with particularly low effort and accordingly quickly, by which ultimately in case of error the operator can accordingly be provided with additional time to take over the control of the motor vehicle. Moreover, computing effort can be saved on the vehicle side, since, for example, a separate artificial neural network, which is typically relatively demanding with respect to required hardware or computation resources, does not have to be operated for the error prediction.

In a further possible embodiment of the present invention, the visualization is generated in the form of a heat map. Detected or predicted errors or the corresponding error areas can be represented therein as more intensive, colored, lighter, more lighted, or in a different color than other areas which were predicted as correctly classified by the segmentation model. Various areas can be adapted, thus, for example, colored or brightened or darkened here, for example, according to a respective error probability or confidence, according to a difference between the respective pixels or areas of the reconstruction image mentioned at another point and the underlying image, and/or the like. A continuous or graduated adaptation or coloration can be provided here. This enables the attention or the focus of the operator to be guided particularly easily and reliably automatically according to the relevance to specific image areas. To assist this effect, for example, it can be provided that all areas for which an error probability lying below a predetermined probability threshold value or a deviation lying below the predetermined difference threshold value between the reconstruction image and the underlying image was determined can be represented uniformly. For these areas, for example, a monochromatic or black-and-white representation or a representation in grayscale can be used, whereas the error areas can be represented in color. The attention or the focus of the operator can thus be guided or concentrated particularly reliably and effectively on the error areas, which can be particularly relevant for the safe control of the motor vehicle in the respective situation.

In a further possible embodiment of the present invention, it is determined which functionality or functionalities, thus which high-level task, is affected by the predicted or detected errors. This, thus a corresponding specification, is then sent with the request to the vehicle-external operator. In other words, it is thus specified with or in the request of the vehicle-external operator which high-level task in the autonomous control of the motor vehicle has resulted in the error, thus could not be correctly executed. This can enable the operator to make an improved assessment of the respective situation, since it can represent an additional indication about which problem, which object, or which circumstance has resulted in the disengagement of the motor vehicle and thus has to be taken into consideration or handled by the operator. Examples of such high-level tasks or functionalities can be or comprise, for example, the lateral guidance of the motor vehicle, a recognition of the course of a roadway or lane, a traffic sign recognition, an object recognition, and/or the like. The operator can thus be informed, for example, about whether they should primarily focus their attention on steering the motor vehicle along an unusual course of the road, an evasion maneuver, or setting an appropriate or permissible longitudinal velocity of the motor vehicle. This can further simplify and accelerate the initiation of corresponding measures by the operator and thus contribute to the further improved safety and an optimized flow of traffic.

A further aspect of the present invention is an assistance unit for a motor vehicle. The assistance unit according to embodiments of the invention includes an input interface for acquiring images or corresponding image data, a computer-readable data storage unit, a processor unit, and an output interface to output a request for a takeover of control by a vehicle-external operator and an assisting visualization. The assistance unit according to embodiments of the invention is configured for carrying out, in particular automatically, at least one variant of the method according to the invention. For this purpose, for example, a corresponding operating or computer program can be stored in the data storage unit, which represents, thus codes or implements, the method steps, measures, and sequences of the method according to embodiments of the invention, and is executable by the processor unit to carry out the corresponding method or to cause or effectuate it being carried out. For example, the mentioned models can thus be stored in the data storage unit. The assistance unit according to embodiments of the invention can in particular be or comprise the corresponding unit mentioned in conjunction with the method according to embodiments of the invention or a part thereof.

A further aspect of the present invention is a motor vehicle, which includes a camera for recording images of a respective environment of the motor vehicle, an assistance unit according to embodiments of the invention invented therewith, and a communication unit for wirelessly sending the request to take over control and the visualization and for wirelessly receiving control signals for a control of the motor vehicle. The communication unit can be an independent unit of the motor vehicle or can be entirely or partially part of the assistance unit, thus, for example, entirely or partially integrated therein. The motor vehicle according to embodiments of the invention is thus configured to carry out the method according to embodiments of the invention. Accordingly, the motor vehicle according to embodiments of the invention can in particular be the motor vehicle mentioned in conjunction with the method according to embodiments of the invention and/or in conjunction with the assistance unit according to embodiments of the invention.

Further features of the invention can result from the claims, the figures, and the description of the figures. The features and combinations of features mentioned above in the description and the features and combinations of features shown hereinafter in the description of the figures and/or in the figures alone are usable not only in the respective specified combination but also in other combinations or alone without departing from the scope of the invention.

DETAILED DESCRIPTION OF THE DRAWINGS

Attempts are presently being made for the increasing automation of vehicles, wherein, however, completely safe autonomous operation is presently not yet possible in any situation. It therefore results as a possible scenario that a vehicle is temporarily autonomously underway, but in individual situations, which cannot be autonomously managed by the vehicle, however, the control of the vehicle is taken over by an operator, who is in particular external to the vehicle. However, the problem arises here that such a takeover of control can occupy a significant time, for example up to 30 seconds. Moreover, it can be difficult for the vehicle-external teleoperator, to which, for example, multiple views of an environment of the respective vehicle recorded from different perspectives are provided, to acquire the respective environment and driving situation and react appropriately as quickly as possible, thus to control the respective vehicle safely.

Figure 1:
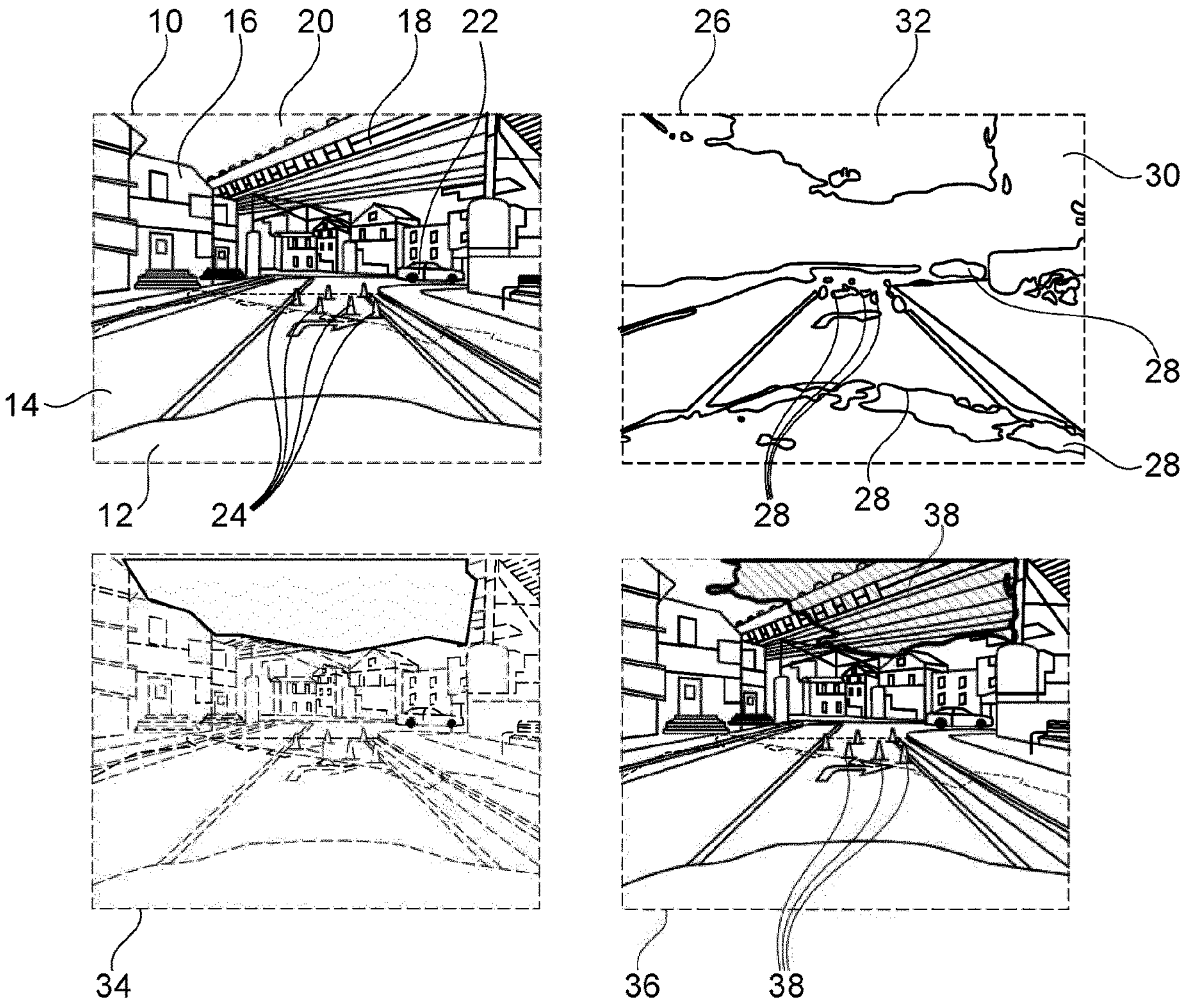
FIG. 1 shows a schematic overview of multiple image processing results to illustrate a method for simplifying a vehicle-external takeover of a vehicle control.
Figure 2:
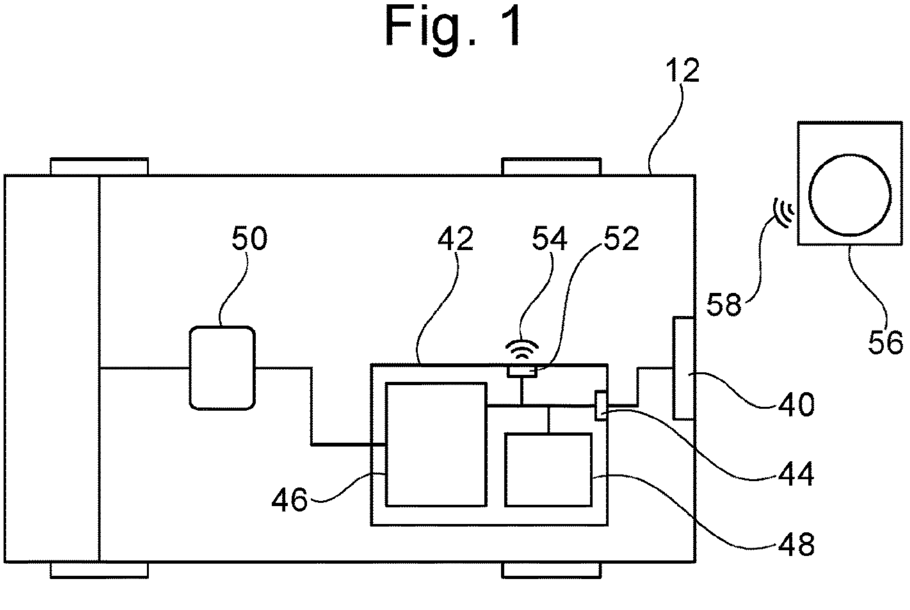
FIG. 2 shows a schematic representation of a motor vehicle configured for the method and a vehicle-external control point.

To counter these difficulties, a method is proposed in the present case, for the illustration of which FIG. 1 schematically shows an overview of multiple image processing results arising here. Reference is also made here to FIG. 2 for their explanation, in which a correspondingly configured motor vehicle 12 is schematically shown.

In a conditionally automated operation of the motor vehicle 12, images 10 of the environment of the motor vehicle 12 are recorded therefrom, of which one is shown here by way of example and schematically. For this purpose, the motor vehicle 12 can be equipped with at least one camera 40. In the image 10 shown here, a traffic scene along a road 14, on which the motor vehicle 12 is moving, is depicted by way of example. The road 14 is laterally delimited therein by buildings 16 and is spanned by a bridge 18. In addition, the sky 20 is also depicted in some areas. Furthermore, an external vehicle 22 is shown here by way of example as representative of other road users. An obstacle, in the present case in the form of multiple traffic cones 24, which block a lane of the road 14 traveled by the motor vehicle 12, is located in the travel direction in front of the motor vehicle 12.

The image 10 is transmitted to an assistance unit 42 of the motor vehicle 12 and is acquired thereby via an input interface 44. The assistance unit 42 comprises a data memory 46 and a processor 48, for example a microchip, microprocessor, microcontroller, or the like, for processing the image 10. A semantic segmentation 26 is thus generated from the image 10. Various areas and objects corresponding to a present understanding of a segmentation model used for this purpose, which can be stored in the data memory 46, for example, are classified in this semantic segmentation 26. In the present case, the segmentation model has assigned a vehicle classification 28 to at least some areas of the front hood of the motor vehicle 12 recognizable in the image 10 and the external vehicle 22 but also—incorrectly— to the obstacle 24, thus the traffic cones. Both the actual buildings 16 and also—likewise incorrectly—parts of the bridge 18 were assigned a building classification 30. Both the sky 20 and also—likewise incorrectly—other parts of the bridge 18 were assigned a sky classification 32. This means that the segmentation model has made multiple errors in the semantic segmentation of the image 10.

By way of a reconstruction model, which is also stored in the data memory 46, for example, a reconstruction image 34 is generated on the basis of the semantic segmentation 26. This reconstruction image 34 represents the most realistic possible approximation or reconstruction of the image 10 underlying the respective semantic segmentation 26.

The assistance unit 42 then forms a difference between the original image 10 and the reconstruction image 34. The image 10 and the reconstruction image 34 are thus compared to one another here, wherein an average deviation from one another can be calculated. Anomalies can be detected on the basis of the difference or deviation between the image 10 and the reconstruction image 34, such as in this case areas of the obstacle 24 and the bridge 18.

If no significant anomalies are detected in this case, this indicates that the assistance system 42 correctly interprets the respective situation. Accordingly, based on this interpretation, thus in particular based on the semantic segmentation 26, the motor vehicle 12 or at least a vehicle unit 50 of the motor vehicle 12 can be automatically or autonomously controlled.

In contrast, if the detected anomalies are sufficiently large, thus meet a predetermined threshold value criterion, for example, a request for a takeover of control by an operator can be generated by the assistance unit 42. This request can be output, for example, via an output interface 52 of the assistance unit 42, for example, in the form of a wirelessly emitted request signal 54, which is schematically indicated here. This request signal 24 can be sent to a vehicle-external teleoperator 56. This teleoperator can thereupon send control signals 58, also schematically indicated here, to the motor vehicle 12 in order to remote control it wirelessly.

To facilitate an acquisition of the respective situation in which the motor vehicle 12 is located for the teleoperator 56, moreover a visualization 36 is generated on the basis of the anomalies or segmentation errors which have been detected, in particular with pixel accuracy. Therein—at least probable or suspected—incorrect classifications, thus error areas 38 corresponding to the anomalies are visually highlighted. This visualization 36 can also be sent as part of the request signal 54 to the teleoperator 56. It can be indicated in an intuitively comprehensible manner to the teleoperator 56 by the visualization 36 having the highlighted error areas 38 where a cause for the respective request to take over control is located. The teleoperator 56 can thus particularly quickly and effectively recognize the areas most relevant for a safe control of the motor vehicle 12 and accordingly react quickly without having to initially search the entire image 10 for possible problem points.

Overall, the described examples thus show how detecting and visualizing areas problematic from the aspect of the respective vehicle for its autonomous operation of vehicles can contribute to an improved situation acquisition and situation comprehension of a vehicle-external operator.

LIST OF REFERENCE NUMERALS

10 image
12 motor vehicle
14 road
16 buildings
18 bridge
20 sky
22 external vehicle
24 obstacle
26 segmentation
28 vehicle classification
30 building classification
32 sky classification
34 reconstruction image
36 visualization
38 error area
40 camera
42 assistance unit
44 input interface
46 data memory
48 processor
50 vehicle unit
52 output interface
54 request signal
56 teleoperator
58 control signal

The invention claimed is:

1. A method for simplifying a takeover of control of a motor vehicle by a vehicle-external operator, the method comprising:

in a conditionally automated operation of the motor vehicle, acquiring and semantically segmenting images of an environment of the motor vehicle by way of a predetermined trained segmentation model, based on at least one of the images in each case, predicting errors of the segmentation model, for an error prediction, which, according to a predetermined criterion, triggers an automatic output of a request for the takeover of control by the vehicle-external operator, automatically generating an image-based visualization that includes an image and visual highligting of an area of the image corresponding to the error prediction, wherein the visual highlighting is superimposed on the image, and sending the request and the visualization to the vehicle-external operator, wherein:

the errors of the segmentation model are predicted pixel by pixel, an average error is determined based on the errors of the segmentation model for the respective image, and it is checked as at least a part of the predetermined criterion whether the average error is greater than a first predetermined error threshold value.

2. The method according to claim 1, wherein:

a number of the predicted errors is determined based on the errors of the segmentation model for the respective image, and it is checked as part of the predetermined criterion whether the number of the errors is greater than a second predetermined error threshold value.

3. The method according to claim 1, wherein:

a size of a coherent area of error pixels is determined, and whether the size corresponds at least to a predetermined size threshold value is checked as part of the predetermiend criterion.

4. The method according to claim 1, wherein:

by way of a predetermined reconstruction model, from a semantic segmentation, the image underlying the semantic segmentation is approximated by generating a corresponding reconstruction image and the respective visualization is generated based on the reconstruction image.

5. The method according to claim 4, wherein:

the reconstruction model comprises generative adversarial networks.

6. The method according to claim 4, wherein:

to predict the errors, the reconstruction image is compared to the respective underlying acquired image and the errors are predicted based on detected differences.

7. The method according to claim 1, wherein:

the visualization is generated in a form of a heat map.

8. The method according to claim 1, further comprising:

determining which functionality is affected by the errors, and sending the functionality with the request to the vehicle-external operator.

9. An assistance unit for the motor vehicle, the assistance unit comprising:

an input interface for acquiring the images, a data storage unit, a processor unit, and an output interface for outputting the request for the takeover of control by the vehicle-external operator and the visualization, wherein the assistance unit is configured to carry out the method according to claim 1.

10. A motor vehicle comprising:

a camera for recording the images, the assistance unit according to claim 9, wherein the assistance unit is connected to the camera, and a communication unit for wirelessly sending the request for the takeover of control and the visualization and for wirelessly receiving control signals for control of the motor vehicle.

11. The method according to claim 1, wherein:

the average error is determined as an average error probability, confidence, or degree of severity over all pixels of the respective image.

* * * * *